Feb. 10, 1970 J. E. BOUGHTWOOD 3,495,099
POLAR LEG ADAPTER CIRCUIT
Filed May 10, 1967
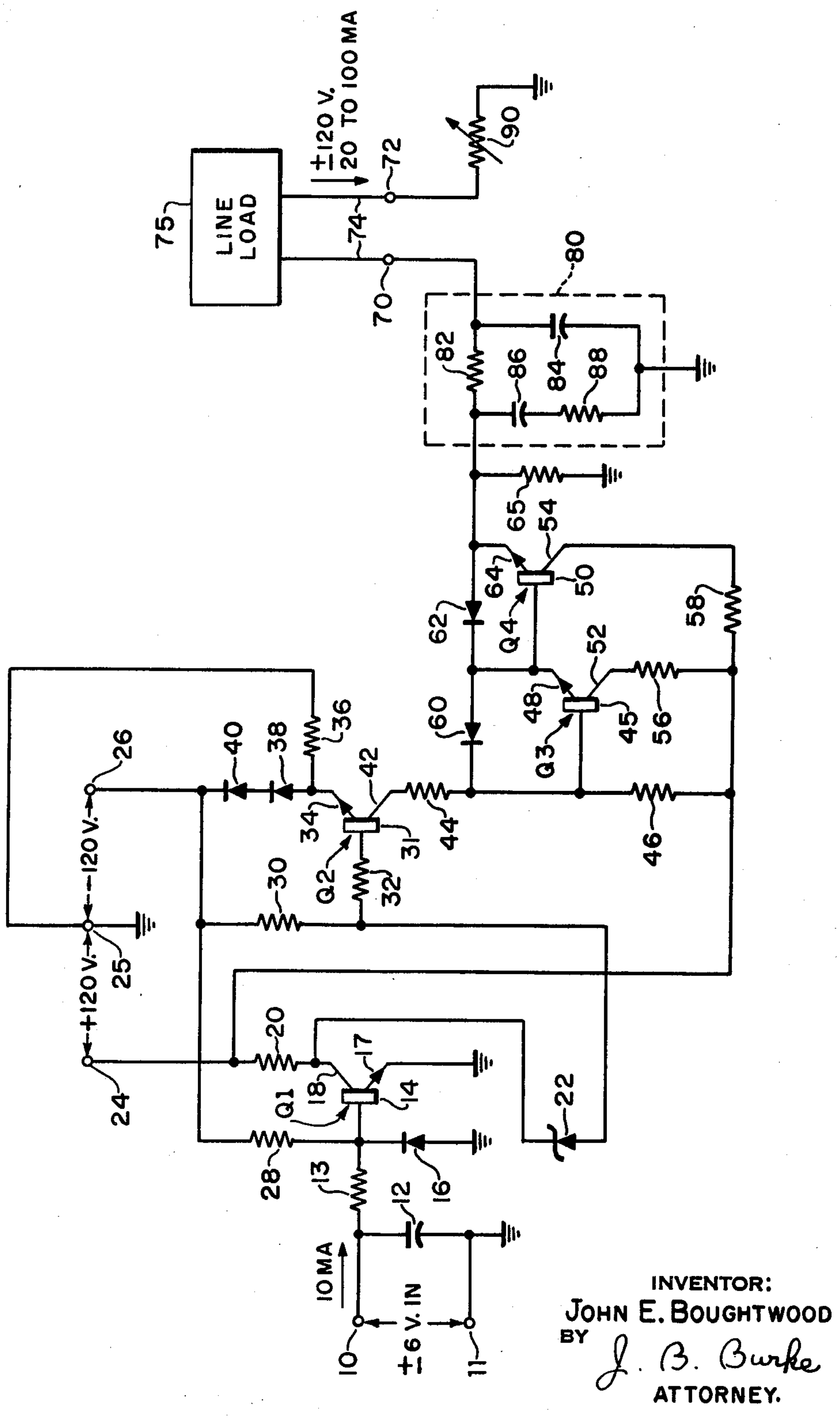
INVENTOR:
JOHN E. BOUGHTWOOD
BY J. B. Burke
ATTORNEY.

3,495,099

POLAR LEG ADAPTER CIRCUIT

John E. Boughtwood, Halsite, N.Y., assignor to The Western Union Telegraph Company, New York, N.Y., a corporation of New York Filed May 10, 1967, Ser. No. 637,389
Int. Cl. H03k *17/60*
U.S. Cl. 307—254 7 Claims

ABSTRACT OF THE DISCLOSURE

The disclosure describes a polar leg adapter circuit for transmitting mark-space signals. The adapter converts 6 volts, 10 milliamperes polar signals received on the leg input to 120 volts polar signals at currents between 20 and 100 milliamperes, for transmission to a line load. The circuit employs high voltage, high temperature transistors as switching devices, with associated diodes serving to isolate the positive 120 volts potential from the leg circuit while negative 120 volts marking current is being supplied. The diodes are back biased and the negative 120 volts source is isolated from the leg circuit while spacing current is being supplied from the positive 120 volts source.

The invention concerns improvements in polar leg adapter circuits used for transmitting mark-space signals over a transmission line.

Heretofore in polar leg adapter circuits used for low voltage conversion of 6 to 12 volts, it has been possible to use a complementary silicon-germanium pair of transistors. The conduction of the germanium transistor results in minus 12 volts potential appearing at the common emitter terminal of the pair, to supply marking current; while the conduction of the silicon transistor results in application of positive 12 volts potential at the common emitter terminal to supply spacing current to a transmission line. The use of complementary silicon-germanium transistors is tolerable for low voltage adapters. When high voltage polar adapters are required for conversion of signals to 120 volts, the prior germanium transistors can not be used because of severe temperature limitations and inability to operate at high voltages.

In the present invention the difficulty is overcome by eliminating the germanium transistor from the circuit and instead employing high temperature silicon transistors. This replacement is made possible by providing diodes between the emitters and bases of the silicon transistors. When the diodes are conducting due to spacing current flowing in the transmission line they force the silicon transistors into nonconducting state and effectively isolate plus 120 volts potential from the leg circuit. When marking voltage is not being supplied to the line the two silicon transistors become conducting, the two diodes are back biased, and spacing current is supplied to the line from the positive 120 volts source.

It is herefore a principal object of the invention to provide a polar leg telegraph transmission circuit in which high temperature, high voltage silicon transistors are employed for passing high voltage marking and spacing currents to a transmission line.

A further object is to provide a polar leg circuit as described, with diodes inserted between emitters and bases of the silicon transistors for effectively isolating a positive voltage source from the circuit while negative marking current is being supplied to a transmission line, and for applying a positive voltage source to the circuit while marking voltage is not being supplied to the line.

The invention will be explained in further detail in connection with the drawing in which is shown schematically a circuit embodying the invention.

Referring to the drawing, there is shown a polar leg telegraph circuit having input terminals 10, 11 to which negative and positive polar low voltage polar signals are applied. The signals are alternately negative marking and positive spacing as is conventional. The input signals have a low magnitude such as 6 volts at 10 milliamperes. Terminal 11 is grounded. Capacitor 12 is connected across the input. Current limiting resistor 13 is connected in series with input terminal 10. The circuit has a first silicon transistor Q1 which has a base 14 connected to resistor 13. A diode 16 is connected between base 14 and ground. The emitter 17 is grounded. Collector 18 is connected to the junction of resistor 20 and Zener diode 22. The circuit has high positive voltage supply terminals 24, 25 and high negative voltage supply terminals 25, 26. The voltage sources may be plus and minus 120 volts as indicated in the drawing. Base 14 of transistor Q1 is connected via resistor 28 to negative terminals 26. Collector 18 is connected via resistor 20 to positive terminal 24. Connected in series with terminal 26 is a resistor 30 and Zener diode 22.

A high voltage second silicon transistor Q2 has base 31 connected via a resistor 32 to the junction of resistor 30 and diode 22. Emitter 34 is connected to ground via a resistor 36. Diodes 38 and 40 are connected in series between emitter 34 and negative terminal 26. A resistor 44 is connected to collector 42.

The circuit includes two other high voltage silicon transistors Q3 and Q4. Transistor Q3 has base 45 connected to resistors 44 and 46. Base 45 is connected to positive terminal 24 via resistor 46. Emitter 48 is connected to base 50 of transistor Q4. Collector 52 and 54 are connected to positive terminal 24 via resistors 56, 58 respectively. A diode 60 is connected between emitter 48 and base 45 of transistor Q3. A second diode 62 is connected between emitter 64 and base 50 of transistor Q4. Emitter 64 is connected to ground via resistor 65.

The circuit has output terminals 70, 72 to which line load 75 is connected via high voltage output transmission line 74. Preceding the output line is an anti-noise network 80 including a series resistor 82 and parallel capacitors 84, 86. Capacitor 86 is grounded via resistor 88. Line terminal 74 goes to ground via a variable resistor 90.

High voltage polar marking and spacing currents are supplied to line 74 at a set magnitude in a range such as 20 to 100 milliamperes, depending on the setting of resistor 90, and the values of the other resistors in the circuit.

In operation of the circuit, negative low voltage marking signals (—6 volts at 10 milliamperes) are applied at input terminal 10 to base 14 of transistor Q1 via resistor 13. This forces transistor Q1 into nonconducting state. A current will then flow from the positive high voltage terminal 24 through resistor 20, Zener diode 22, and resistor 30 to negative termnial 26. The potential at the base 31 of transistor Q2 will then be more positive than its emitter 34 which causes transistor Q2 to conduct. A negative marking current ranging from 20 to 100 milliamperes then flows from ground through variable resistor 23, line 74, line load 75, resistor 82, diodes 62 and 60, resistor 44, transistor Q2, diodes 38, 40 to negative terminal 26. The current through diodes 60, 62 causes emitters 48, 64 of transistors Q3, Q4 to be more positive than their respective bases, thereby forcing these transistors into nonconducting state. This effectively isolates the positive high voltage at terminal 24 from the leg portion of the circuit.

When positive low voltage spacing signals (+6 volts at 10 milliamperes) are received at input terminal 10, they cause transistor Q1 to conduct thereby back biasing Zener diode 22 since the Zener diode has a 150 v. breakdown threshold. This applies negative high voltage (—120 volts) at base 31 of transistor Q2 forcing it into a nonconducting state and isolating the negative voltage source at terminal 26 from the polar leg circuit. A leg current then flows from the positive high voltage terminal 24 through resistor 46, the base-emitter junction of transistor Q3 and the base-emitter junction of transistor Q4. These two transistors are thus conducting with transistor Q4 in saturation and a spacing current of 20 to 100 milliamperes flows to ground via the transmission line 74. Diodes 60 and 62 are both back biased during this condition so that current must flow through transistors Q3 and Q4 causing them to conduct.

It will be noted that the presence of the diodes 60, 62 makes successful operation of the circuit possible, and insures automatic cut-off of high positive voltage during marking, and application of high positive voltage during spacing.

While the circuit has been explained in connection with input and output of 6 volts and 120 volts respectively, other relatively low and high voltages can be employed.

What is claimed is:

1. A polar leg adapter circuit for converting low voltage marking and spacing signals to high voltage marking and spacing signals respectively, comprising, a pair of input terminals for applying said low voltage signals thereto;

negative and positive high voltage direct current sources;

a first transistor connected between the input terminals and the positive high voltage source so that said transistor is rendered nonconductive when negative low voltage marking signals are applied to the input terminals;

a pair of line load output terminals;

a second transistor connected in series with a resistor, a high threshold voltage Zener diode, said line load output terminals and said negative high voltage source, whereby said second transistor is rendered conductive when the first transistor is rendered nonconductive so that negative high voltage marking signals are applied to the line load output terminals via said Zener diode when negative low voltage marking signals are applied to the input terminals;

third and fourth transistors connected between the positive high voltage source and said output terminals;

and means rendering the third and fourth transistors nonconductive to isolate said positive high voltage source from the output terminals when said low voltage negative signals are applied to the output terminals.

2. A polar leg adapter circuit as recited in claim 1, wherein the last named means is a pair of rectifier diodes connected in series with the output terminals, whereby the first transistor will be rendered conductive when low voltage positive signals are applied to the input terminals, the second transistor will be rendered nonconductive, the third and fourth transistors will be rendered conductive to pass positive high voltage spacing signals to the output terminals, and the negative high voltage will be isolated from the output terminals by the second transistor.

3. A polar leg adapter circuit as recited in claim 2, wherein the transistors are all silicon transistors rated to pass currents at said high voltages therethrough.

4. A polar leg adapter circuit as recited in claim 3, wherein the input signals have voltages of approximately six volts, and wherein the high voltage sources have potentials of 120 volts each.

5. A polar leg adapter circuit as recited in claim 3, wherein each of the third and fourth transistors has a base and emitter, one of the rectifier diodes being connected between the base and emitter of the third transistor, the other rectifier diode being connected between the base and emitter of the fourth transistor, both of the diodes being connected.

6. A polar leg adapter circuit as recited in claim 5, further comprising an anti-noise filter circuit connected between the fourth transistor and the output terminals.

7. A polar leg adapter circuit as recited in claim 6, further comprising a variable resistor in series with the output terminals for adjusting the magnitude of currents passing to the output terminals.

References Cited

UNITED STATES PATENTS

| | | | |
|---|---|---|---|
| 3,271,590 | 9/1966 | Sturman | 307—214 |
| 3,381,144 | 4/1968 | Thomas | 307—214 |

JOHN S. HEYMAN, Primary Examiner

DAVID M. CARTER, Assistant Examiner

U.S. Cl. X.R.

307—236, 262, 285